March 25, 1958  A. B. WEST  2,827,972
LOAD CARRYING VEHICLE AND TRACK
Filed Sept. 23, 1955  2 Sheets-Sheet 1
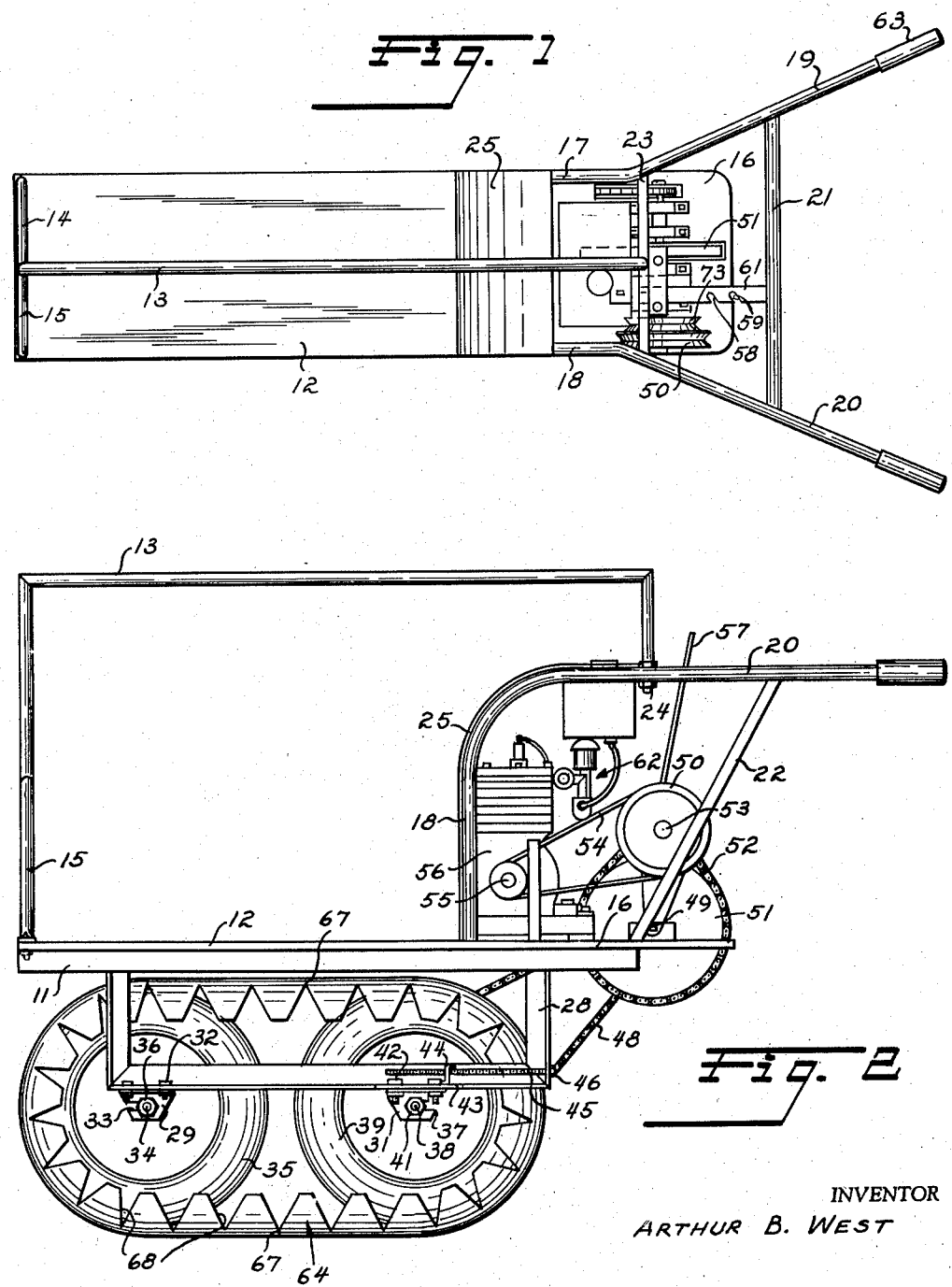

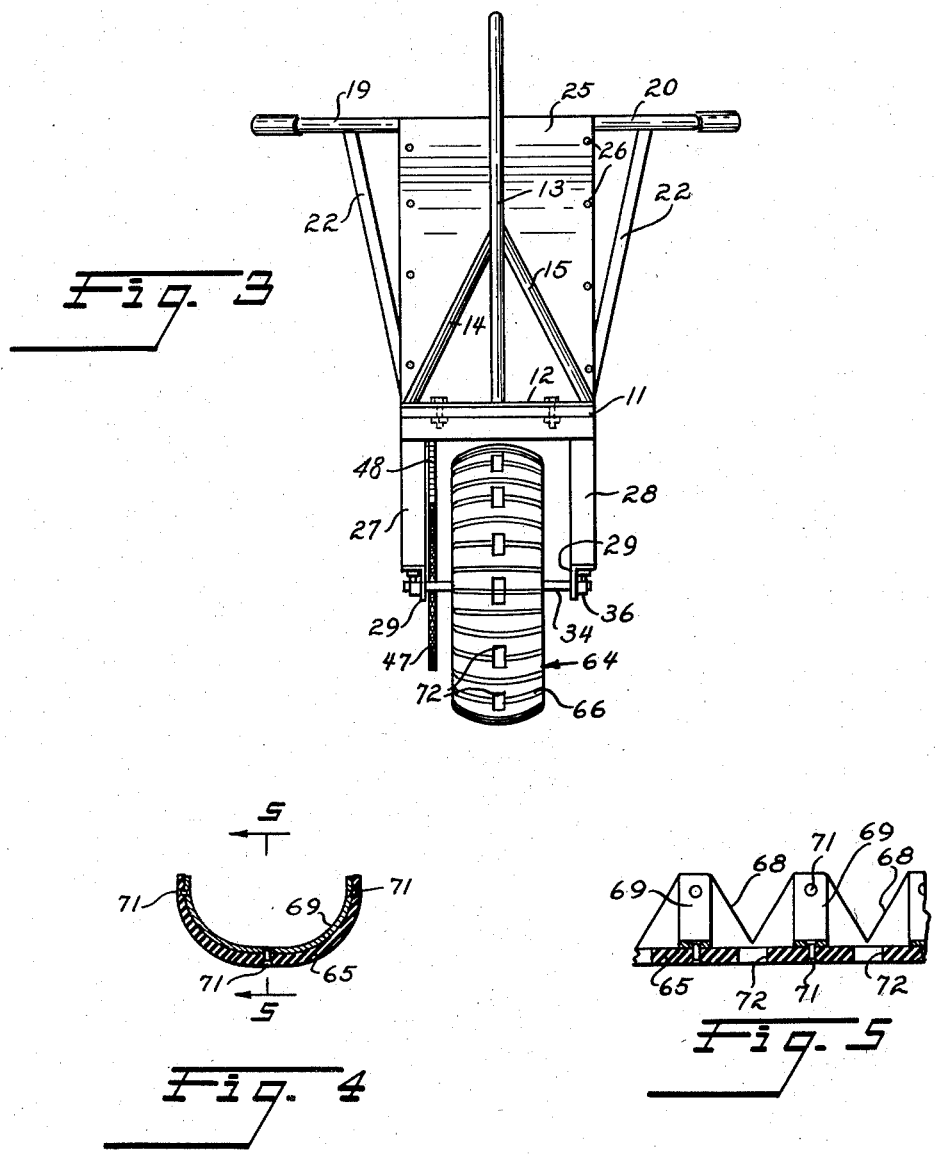

United States Patent Office 2,827,972
Patented Mar. 25, 1958

2,827,972
LOAD CARRYING VEHICLE AND TRACK

Arthur B. West, Boise, Idaho

Application September 23, 1955, Serial No. 536,165

4 Claims. (Cl. 180—9.1)

This invention relates to vehicles and particularly to a low powered low speed load carrying vehicle of special construction.

In its preferred embodiment the vehicle of the invention will be described as for packing loads in the neighborhood of 500 pounds over off-highway terrain. It has been used in hunting in mountainous territory as a mechanical packhorse for carrying in supplies and carrying out bears, etc. It also has use in carrying prospecting equipment and the like.

Basically the vehicle of the invention comprises a load carrying platform supported by single tandem wheels running within an endless traction member which latter is of novel structure apart from the vehicle. The wheels are so mounted as to be adjustable and readily removable, and at least one wheel is driven from a power plant at the rear of the platform. At the rear of the platform arise handle bars at about waist level of the operator for steering and controlling the vehicle while walking behind it.

It is therefore the major object of the invention to provide a novel low speed vehicle having a load carrying platform supported on an endless track and having rear controls for the operator.

It is a further object of the invention to provide a novel vehicle wherein a load carrying platform is supported upon single tandem wheels within an endless track, with at least one wheel driven by a power plant on the platform.

A further object of the invention is to provide a load carrying low speed vehicle wherein a platform is supported upon and endless track of special construction.

It is a further object of the invention to provide a novel single tandem endless track drive wherein two wheels, one of which is power driven, are relatively separably adjustable on a support and one drivingly disposed within an endless ground engaging track.

A further object of the invention is to provide a novel endless ground engaging track structure which is longitudinally flexible and which is laterally substantially inflexible.

It is a further object of the invention to provide a novel endless ground engaging track of rubber or the like having a multiplicity of longitudinally spaced laterally rigid internal braces.

Further objects will appear as the description proceeds in connection with the annexed drawings wherein:

Figure 1 is a top plan view of a load bearing vehicle according to the preferred embodiment of the invention;

Figure 2 is a side elevation of the vehicle;

Figure 3 is a front elevation of the vehicle;

Figure 4 is a lateral section through the endless track; and

Figure 5 is a fragmentary longitudinal section on line 5—5 through the endless track.

The vehicle comprises a frame 11 upon which is secured a generally horizontal platform 12 which as shown in Figure 1 is preferably elongated longitudinally of the vehicle. A support bar 13 arises from the front end of the platform (Figure 3) extends above and extends parallel to the platform (Figure 2). At its front end it is suitably fixed to the platform or frame and is laterally braced by inclined rigid bars 14 and 15 extending from the platform corners.

The rear portion of platform 12 designated at 16 is essentially a power plant support, and just forwardly of this area spaced upright bars 17 and 18 arise from the platform and (Figure 2) curve over to provide generally horizontal but diverging (Figure 1) handle bar sections 19 and 20 respectively. The handle bars are rigidly tied together by a transverse member 21 (Figure 1) and braced by rearwardly inclined struts 22 extending between the platform corners and member 21.

At the juncture of the handle bars with the horizontal sections of bars 17 and 18 a transverse brace 23 rigidly interconnects the bars and the rear end of rod 13 turns down to be rigidly secured to brace 23 as indicated at 24. Preferably a rear panel 25 is provided vertically arising from platform 12 and extending up along bars 17 and 18 at least until they become horizontal. Panel 25, which may be an integral sheet metal extension of platform 12, separates the load carrying part of the vehicle from the power plant on area 16, and is secured to bars 17 and 18 as by screws 26.

The frame 11, platform 12, bars 13, 14, 15, 17 and 18, transverse member 21, struts 22, brace 23 and panel 25 are all rigidly and tightly secured together to mutually brace each other into a sturdy rigid assembly.

Below platform 12 two generally U-shaped depending subframes 27 and 28 are rigidly secured to, or may be parts of, the main frame 11. Subframes 27 and 28 are parallel and extend beneath opposite side edges of the platform. Each subframe (Figure 2) has a forward wheel mounting bracket 29 and a rear wheel mounting bracket 31.

Brackets 29 are aligned transversely of the frame and each is removably secured to its subframe as by bolts 32. Each bracket 29 has a forwardly open slot 33 providing a bearing support for the axle 34 of front wheel 35. Suitable retainer nuts 36 limit lateral shift of axle 34 on the subframes, and the front wheel 35 is thus suitably idly mounted on the subframes.

Each laterally aligned bracket 31 has a rearwardly extending slot 37 for bearing support of opposite ends of the axle 38 of rear wheel 39 which has retainer nuts 41 like those of the front wheel. Brackets 31 are removably and adjustably secured to the subframes as by bolts 42 extending through slots 43 that permit longitudinal shift of bracket 31. A lug 44 upstands from each bracket to threadedly receive an adjustment rod 45 having a head 46 bearing on the subframe, so that when rod 45 is rotated bracket 31 shifts along its subframe and then bolts 42 are tightened to maintain the adjustment for a purpose to appear. If desired this adjustment could be provided for the front wheel brackets 29, or even for both wheels.

A sprocket 47 fixed directly on rear wheel 39 or on rear axle 38 is connected by chain 48 to a sprocket (not shown) on transverse shaft 49 which in turn carries a sprocket 51 connected by chain 52 to a sprocket (not shown) on transverse shaft 53. A clutch pulley 50 on shaft 53 is connected by belt 54 to the output shaft 55 of internal combustion engine 56. A clutch control lever 57 is suitably connected to control clutch pulley 50 and it may be latched in clutch engaged or disengaged positions in notches 58 and 59 respectively in a brace 61 connected between members 21 and 23. The engine carburetor and throttle assembly at 62 is controlled by suitable connections extending through the hollow bar 19 from rotatable handle grip 63, as in a conventional motorcycle, or a separate control may be used. The motor upper sprockets, clutch pulley etc. are all mounted on platform area 16 behind panel 25.

It will be understood that the invention includes any suitable power plant and drive train may be used to drive at least the rear wheel 39. The foregoing described power plant and drive reduction is used in a preferred embodiment for moving the vehicle at a slow speed corresponding to the average man's walking speed, about 3–5 miles per hour, but other drives and speeds can be introduced.

The wheels 35 and 39 which are in longitudinal alignment under the centerline of platform 12 may be the usual pneumatic tired small wheels available today on many scooters and like vehicles, and they are encompassed by an endless track unit 64 which is the ground engaging part of the drive. In its preferred embodiment track unit 64 comprises an endless belt 65 of rubber or fabric reenforced rubber having external surface corrugations 66 or formations for improved traction. Actually it has been found desirable to make up the belt of an automobile tire casing or casings cut and spliced into endless form as by vulcanizing along lines 67. Where tire casings are used the sides are notched as at 68 to enable them to flex over the small diameter wheels.

These tire casings have an imparted or inherent lateral curvature as shown in Figure 4 but in order to reenforce and maintain the transverse contour of the track to correspond to that of the tires on wheels 35 and 39 the interior of the track is provided with a multiplicity of longitudinally spaced rigid arcuate metal straps 69. These straps are secured to the belt 65 as by rivets 71, and preferably there is one rigid reenforcing strap between each notch 68. Midway between each rigid strap 69 the center of the belt is formed with apertures 72 which contribute to flexibility of the track and also aid the tractive effort of the track.

It will be appreciated that the flexible traction belt 65 need not be a tire casing but may be specially constructed, flat or laterally curved, and held to the contour of Figure 4 by riveting it to the arcuate straps 69. In a practical embodiment the straps 69 are curved to suit the cross sectional diameter of the tires on wheels 35 and 39 and are located about three and one-half inches apart along the inner periphery of the track.

This endless traction member is disclosed and claimed in the copending divisional application Serial No. 634,986 filed January 18, 1957.

In the vehicle the track 64 is adequately longitudinally flexible to fit snugly around both wheels 35 and 39 and because of the coaction of the usual tire treads on wheels 35 and 39 with the reenforced interior of the track and the weight of the vehicle, when wheel 39 is driven from the motor it drives track 64 which in turn drives the front idler wheel 35. In making the assembly the axles 34 and 38 are placed in the corresponding oppositely facing bracket slots 33 and 37, respectively, the track is arranged about the wheels and the final adjustment of wheel axis spacing to obtain tight drive contact between the track and the wheels is made by rods 45 and locked by bolts 42. This provides a flexible endless track drive that has a large area of ground engaging contact and the ability to maintain traction over rock strewn and irregular terrain. The operator merely has to walk behind with his hands on the handle bar grips whereby the vehicle is easily steered.

During assembly the belt may be connected to the normal speed pulley 50, or if a really slow speed of about one mile per hour is desired the belt may be placed on pulley 73 on shaft 53.

The invention is particularly useful for hunters and sportsmen who may load it into the usual automobile, it weighs only about 150 pounds and that weight can be reduced by using aluminum frames and rods, and then use it to pack into otherwise inaccessible areas because it has the facility of a pack horse for carrying in supplies and carrying out game. Actually the illustrated vehicle will climb a sixty degree grade as fast as a man can follow it.

The invention may be embodied in other specific forms without departing from the spirit or essential characteristics thereof. The present embodiment is therefore to be considered in all respects illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, a frame having means therein providing a substantially horizontal platform comprising a forward load carrying portion and a rear motor support portion, a motor mounted on said rear platform portion, traction means comprising longitudinally spaced wheels at least one of which is driven by said motor and mounted on the frame below said platform, a flexible endless ground engaging traction member extending around and between said wheels in drive engagement therewith, means defining a rigid partition arising from said platform between said front and rear portions, and handle bars extending from said partition rearwardly over said motor to be accessible to an operator walking behind the vehicle, said partition separating the load carrying and motor support areas of said platform.

2. In the vehicle defined in claim 1, wheel mounting brackets on said frame beneath said platform, and means for relatively adjusting said brackets longitudinally of the vehicle to move the wheels into tight engagement with said traction member.

3. In a vehicle, a frame having a platform means thereon providing a forward load carrying portion and a rear motor support portion, a motor mounted on said rear platform portion, an endless belt ground engaging traction member operably mounted on the frame beneath the platform, drive means connecting the motor to said traction member, spaced bars rigid with said platform arising from said platform between said portions and extending rearwardly over the motor to terminate in handle bar control means at the rear of said frame accessible to an operator walking behind the vehicle, and a partition separating the motor supporting and load carrying portions of said platform mounted on said bars.

4. In the vehicle defined in claim 3, an article support bar arising centrally of the front end of said platform and extending above and along the platform, and means rigidly connecting said article support bar to said spaced bars above said motor.

References Cited in the file of this patent

UNITED STATES PATENTS

| | | |
|---|---|---|
| 1,245,293 | White | Nov. 6, 1917 |
| 1,302,317 | Cowan | Apr. 29, 1919 |
| 1,704,857 | Henneuse | Mar. 12, 1929 |
| 1,711,601 | Jereczek | May 7, 1929 |
| 1,722,531 | Matter | July 30, 1929 |
| 1,862,329 | Carden | June 7, 1932 |
| 2,087,396 | Bennett et al. | July 30, 1937 |
| 2,239,122 | Stokes | Apr. 22, 1941 |
| 2,440,518 | Lewis et al. | Apr. 27, 1948 |
| 2,519,745 | Danielson et al. | Aug. 22, 1950 |
| 2,581,587 | Gray | Jan. 8, 1952 |
| 2,621,085 | Bonmartini | Dec. 9, 1952 |
| 2,668,408 | Klenk | Feb. 9, 1954 |

FOREIGN PATENTS

| | | |
|---|---|---|
| 82,194 | Sweden | Dec. 11, 1934 |